United States Patent [19]

Tashiro et al.

[11] Patent Number: 4,976,438
[45] Date of Patent: Dec. 11, 1990

[54] MULTI-PLAYER TYPE VIDEO GAME PLAYING SYSTEM

[75] Inventors: Koichi Tashiro, Yokohama; Mamoru Ikezawa, Tokyo; Takashi Sano, Yokohama; Kosei Matsuura, Kawasaki; Hajime Nakatani, Yokohama, all of Japan

[73] Assignee: Namco Ltd., Tokyo, Japan

[21] Appl. No.: 492,077

[22] Filed: Mar. 12, 1990

[30] Foreign Application Priority Data

Mar. 14, 1989 [JP] Japan ................. 1-28708[U]

[51] Int. Cl.$^5$ .............................. F41J 5/10; F41J 9/14
[52] U.S. Cl. .................................. 273/313; 273/85 G
[58] Field of Search ............... 273/310, 311, 312, 313, 273/85 G, 1 E, 153 R, DIG. 28; 434/20, 21, 22

[56] References Cited

U.S. PATENT DOCUMENTS

| | | | |
|---|---|---|---|
| 4,418,911 | 12/1983 | Bowers et al. | 273/DIG. 28 |
| 4,538,991 | 9/1985 | Simpson et al. | 273/313 |
| 4,659,088 | 4/1987 | Lee et al. | 273/310 |
| 4,738,451 | 4/1988 | Logg | 273/153 R |

FOREIGN PATENT DOCUMENTS

| | | | |
|---|---|---|---|
| 2115659 | 9/1983 | United Kingdom | 434/20 |
| 2155158 | 9/1985 | United Kingdom | 273/312 |

Primary Examiner—Benjamin Layno
Attorney, Agent, or Firm—Oliff & Berridge

[57] ABSTRACT

A multi-player type video game playing system permits a plurality of players to play and enjoy a game within the common game space. The video game has a cylinder-shaped screen; a plurality of projectors arranged and allocated to project a game scene continuously extending around the entire circumference of the cylindrical screen; a plurality of players' operating sections arranged radially toward the screen; and an image processor for computing a game scene to be projected onto the screen in accordance with input signals from the players' operating sections and a predetermined game program. The image signals representative of the computed game scene are supplied to the projectors to form the game scene continuously extending around the entire circumference of the screen, whereby any one of the players can face and observe a transversely widened game scene covering the entire field of view for that player such that all the players can enjoy the game with increased reality.

19 Claims, 13 Drawing Sheets

MULTI-PLAYER TYPE VIDEO GAME PLAYING SYSTEM

BACKGROUND OF THE INVENTION

1. Field of the Invention

The present invention relates a multi-player type video game playing system and particularly to such a system in which a plurality of players can play a game in the common game space while observing game scenes projected onto a screen.

2. Description of the Prior Art

There are known simulation type video shooting games in which a player aims and shoots at targets displayed on a screen. Such video shooting games are played in accordance with various stories. In one of the stories, a player is successively attacked by enemies and at the same time hunts a treasure or treasures while fighting with the enemies. In another story, a player is on board a spaceship and intends to return to the earth while fighting enemies attacking the player.

In such simulation type video shooting games, it is preferred that a screen is enlarged to increase the reality.

The enlargement of a screen necessarily leads to the increase of the manufacturing cost. For such a reason, most video shooting games were provided to allocate a single video monitor to a single player. A proposal has been made in which a screen is formed by using a plurality of video monitors. However, such a screen is at most two or three times that of a single screen and yet has a seam between each adjacent video monitors to reduce the reality.

More recently, another proposal has been made in which a video projector is used with an enlarged screen to permit two players to play a shooting game. In this proposal, however, the enlarged screen is about several times that of a single video monitor. This also lacks the reality.

The inventors have been studying a multi-player type shooting game playing system in which a screen can be enlarged without increase of the manufacturing cost and wherein a number of players can simultaneously play a game against the common screen. Although it is possible for a plurality of players to play the same shooting game against the common enlarged screen, it cannot be avoided that any player will have to shoot his gun against one side margin of the common screen. Therefore, he will feel a reduced degree of reality. In addition, the player positioned against the side margin of the screen will view the screen slantingly. This also decreases the reality for him.

The inventors have found that when it is desired to provide a multi-player type video game system having an enlarged screen formed inexpensively and giving an improved degree of reality, a fearless idea departing from the prior art is required.

SUMMARY OF THE INVENTION

It is therefore an object of the invention to provide a novel and inexpensive multi-player type video game playing system which permits a plurality of players to play a game with improved reality for all of the players.

To this end, the present invention provides a multi-player type video game playing system comprising screen means providing a transversely arched screen; a plurality of projector means radially disposed toward said screen, each of said projector means arranged to project one scene section of transversely continuous game scene onto said screen; a plurality of player's console sections radially arranged toward said screen; and image processing means for processing the game scene sections projected onto said screen in accordance with input signals from said player's console sections and a predetermined game program, said image processing means being adapted to supply image signals to said plurality of projector means such that the processed game scene sections are projected onto said screen as a transversely continuous game scene on said screen, whereby said plurality of players can play the same game within a common game space while observing the common game scene projected onto the arched screen.

When the transversely arched screen on the entire of which a continuous game scene is projected is used and when a plurality of player's console sections are radially arranged toward the screen, a widened image will be displayed in front of each player. Therefore, all of the players can enjoy the game with increased reality.

If the screen is formed into a cylindrical configuration, any player in the interior of the cylindrical screen can view a widened scene covering all the transverse field of view. Even if a plurality of players are to play a multi-player type game, therefore, the widened scene can more improve the reality for all of the players.

BRIEF DESCRIPTION OF THE DRAWINGS

FIG. 1 is a schematic and perspective view of the game playing system.

FIG. 2 is a block diagram of a circuitry used in the game playing system.

FIG. 3 schematically illustrates a player seated on a seat and enjoying a shooting game against the screen.

FIG. 4 illustrates a projection screen area allocated to each player.

FIG. 5 is a block diagram of another circuitry used in the game playing system shown in FIG. 1.

FIGS. 6 through 13 illustrate the second preferred embodiment of a multi-player type video game playing system constructed in accordance with the present invention.

FIG. 6 is a schematic view illustrating the structure of a swingable base mounted in the game playing system.

FIG. 7 is a top view of the central tower in the base as viewed from a direction of arrow VII in FIG. 6.

FIG. 8 illustrates a spherically formed screen onto which a game scene is projected from a projector.

FIG. 9 is a schematic plan view of the entire game playing system according to the second preferred embodiment of the present invention.

FIG. 10 is a fragmentary and perspective view of the game playing system, illustrating clerk's and player's seats on the base.

FIG. 11 is a perspective view illustrating guns used in the second preferred embodiment of the present invention.

FIG. 12 illustrates a player's seat used in the game playing system.

FIGS. 13, 13A and 13B is a block diagram of a circuitry used in the second embodiment of the present invention.

DETAILED DESCRIPTION OF THE PREFERRED EMBODIMENTS

The present invention will now be described in details in connection with some preferred embodiments thereof which are applied to a multi-player type video shooting game.

FIRST EMBODIMENT

Figure 1:
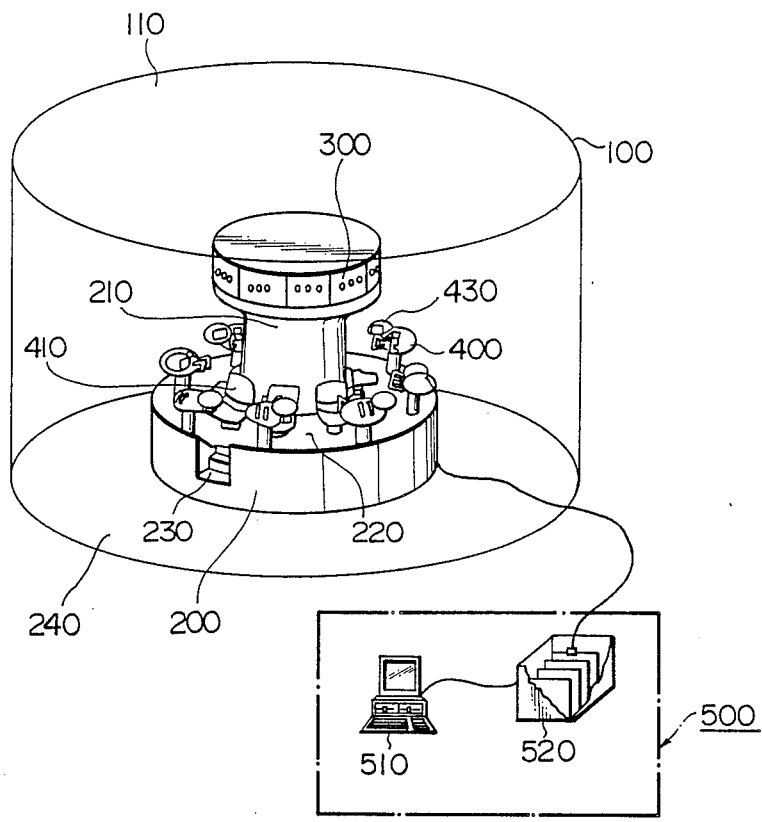
FIGS. 1 through 5 illustrate the first preferred embodiment of a multi-player type video game playing system constructed in accordance with the present invention.

FIG. 1 shows the first preferred embodiment of a multi-player type video shooting game playing system constructed in accordance with the present invention.

The game playing system comprises screen means 100 providing a screen 110 which has an inner wall of cylindrical configuration and a base 200 disposed within the screen 110 substantially at its center. The base 200 comprises a central tower 210; a ring-shaped table 220 located around the central tower 210, a plurality of players being to be placed on the table 220; and stairs 230 provided between the table 220 and a floor 240.

On the top of the central tower 210, there are located a plurality of projectors 300 which are arranged radially toward the screen 110. Each of the projectors 300 is adapted to bear its share of a game scene which transversely continues along the entire circumference of the screen 110.

In the first preferred embodiment, the projectors 300 are radially arranged toward the cylindrical screen 110 about its central axis and then capable of providing an image projected onto the screen 110 without any deformation.

A plurality of guns 400 are arranged on the table 220 at given angular intervals as player's consoles. Each of the guns 400 is capable of shooting targets projected onto the screen 110. In the first embodiment, these guns 400 are arranged radially toward the cylindrical screen 110 around its central axis. Each of the guns 400 is associated with a CRT 430 for displaying player's score and any other instructions. Behind each of the guns 400, there is provided a seat 410 on which a player is to be seated.

Figure 2:
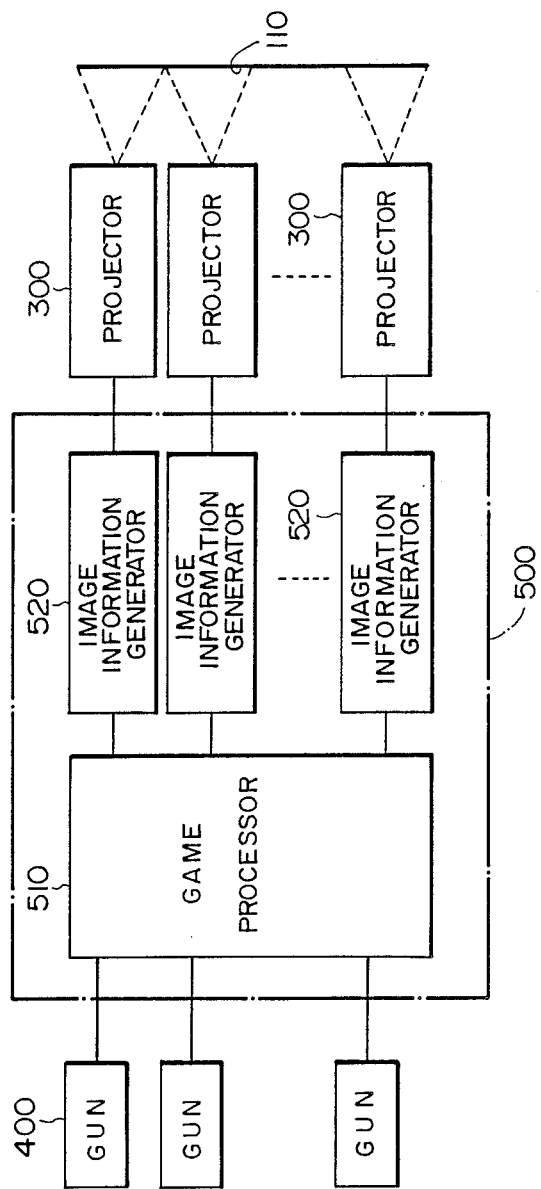

The game playing system further comprises game processing and controlling means 500 for processing and displaying the game scene. FIG. 2 shows a circuitry used in this game playing system.

The game processing and controlling means 500 comprises a game processing device 510 for collectively controlling the entire system and a plurality of image information generators 520 each provided for one of the projectors 300.

In addition to the collective control of the entire system, the game processing device 510 can perform the game processing and determine a game scene section to be projected from each of the projectors 300 onto the corresponding screen section, in accordance with input signals from that projector 400 and also a predetermined game program. The information so determined will be outputted to the corresponding one of the image information generators 520.

Each of the image information generators 520 has previously stored the image information of the entire game. When it receives the information of preparing the game scene from the game processing device 510, the image information generator 520 processes data determined for an image section which is to be actually allocated to the corresponding projector and to be projected onto the screen 110 by that projector. Image signals so obtained are then supplied to the corresponding projector 300.

In such a manner, a continuous game scene will be projected onto the screen 110, extending along the entire circumference of the screen 110. Even if a player is seated on any seat 410 on the table 220, he can front and see a widened game scene extending over the entire field of view with increased reality.

The first preferred embodiment of the present invention will now be described in connection with a video shooting game having a story in which a plurality of players in a spaceship try to return alive to the earth while fighting an enemy.

It is assumed herein that the base 200 is a spaceship and each of the players is seated on the seat 410 and watches the circumference of his spaceship to fight enemy spaceships through his gun 400.

It is also assumed that a space scene viewed through windows in the spaceship is projected onto the screen 110 with 360° panorama-like view.

Each of the image information generators 520 has previously stored game scenes representing a space in which the spaceship is cruising. The game processing device 510 supplies data representing the present position of the spaceship within the space and data relating to vector information of the direction of cruise to all the image information generators 520.

Each of the image information generators 520 actually computes space scenes successively varying with the movement of the spaceship to form a game scene projected onto the screen 110 and continuously extending along the entire circumference thereof.

Figure 3:
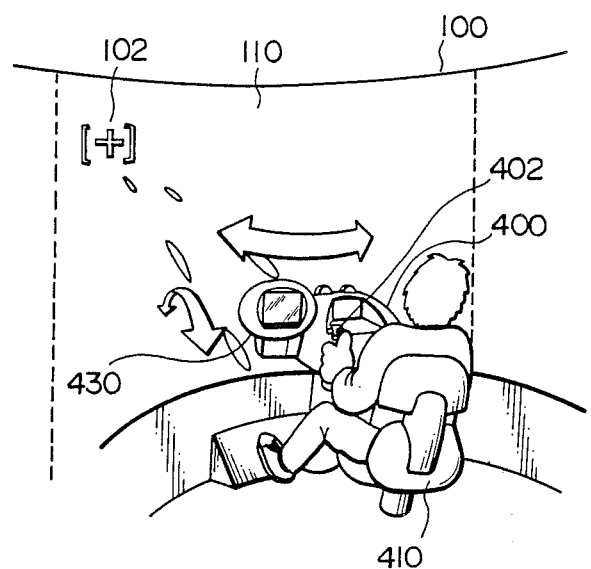

As shown in FIG. 3, for example, any player seated on a seat 410 behind his gun 400 can face and see a widened game scene horizontally extending along the cylindrical screen 110 to cover the entire field of view about that player in the opposite directions. This permits all the players to enjoy their shooting game with improved reality.

When each of the players aims a target moving on the screen 110 by moving his gun 400 in all the directions, the movement of the gun 400 is detected by a sensor and the detected position of the gun 400 is then inputted into the game processing device 510. When received data relating to the position of the gun 400, the game processing device 510 computes the position of the sight 102 on the scene and causes the computed position of the sight 102 to display on the screen 110 through the image information generator 520 and the projector 300.

The player can cause the sight 102 to align with the target moving in the game scene and actuate the trigger 402 in his gun 400. At this time, a signal representing the actuation of the trigger 402 is fed to the game processing device 510 which in turn generates signals used to form images of tracer bullets which are moved toward the sight 102. These signals are then supplied to the corresponding image information generator 520. Thus, tracer bullets moving to the sight 102 will be displayed on the screen 110.

Figure 4:
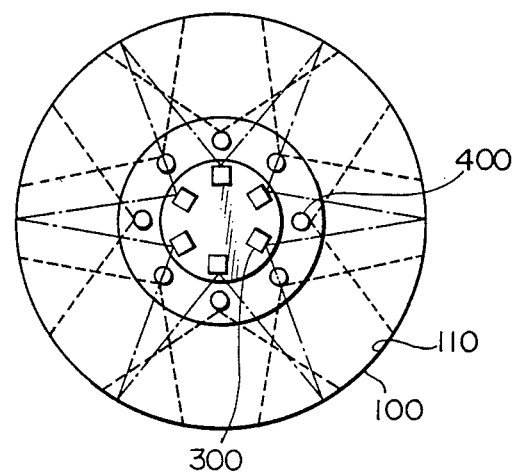

FIG. 4 shows a projection area allocated to each of the projectors 300 and a range of shooting for each of the players. Each of the projectors 300 projects a scene section allocated thereto on the screen 110 within a region shown by one-dot and chain lines. Scene sections from each adjacent projectors are joined to provide a continuous scene extending around the entire circumference of the screen 110.

Each of the players can move the sight 102 on the screen 110 by manipulating his gun 400. The range of shooting which the sight 102 can be moved is defined by two broken lines extending from each of the guns 400 toward the screen 110.

The range of shooting for each gun 400 overlaps those of two adjacent guns 400 at the opposite sides. Thus, any player can compete with another player adjacent to him for the same target within the overlapped scene sections. Any player can also enjoy the shooting game within its own range of shooting without interference from any adjacent player. Particularly, since the first embodiment of the present invention provides a transversely extending game scene larger than the range of shoot for each of the players, he can wait and aim a target which is randomly moving in the game scene with various patterns of motion and enters his range of shooting. Thus, the game playing system of the present invention can provides a very varied and joyful shooting game.

Although it is desired that the scene sections projected from each adjacent projectors 300 onto the screen 110 are tightly overlapped, a little gap is permitted between each adjacent game scene sections without obstacle if a game scene is continuous as a whole. If a game scene section is one observed through a window in the spaceship, the gap may be utilized to form one side frame in that window.

Figure 5:
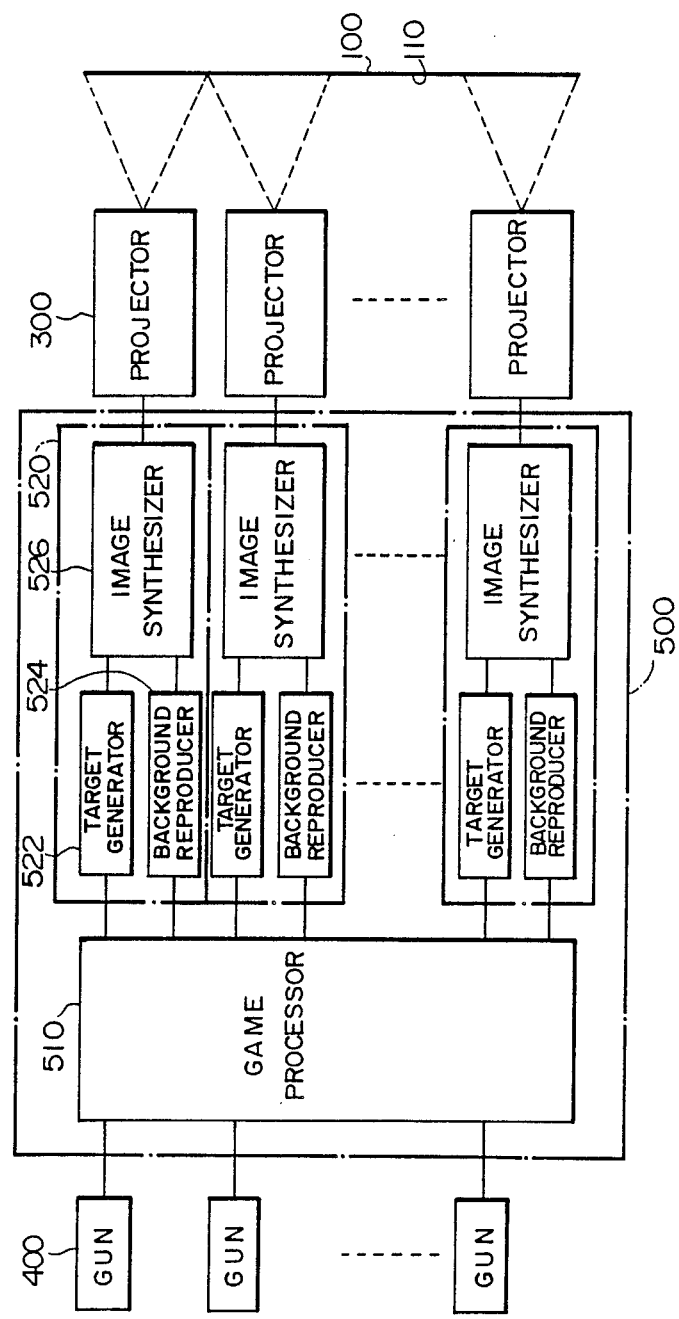

FIG. 5 shows another circuitry of a game processing and controlling means 500 usable in the game playing system of the present invention.

This game processing and controlling means 500 comprises a plurality of image information generators 520, each of which is provided one for each of the projectors 300 and comprises a target image generator 522, a background reproducer 524 and an image synthesizer 526.

The target image generator 522 actually computes an image representing a target in accordance with a command from the game processing device 510, the computed data of image being then supplied to the image synthesizer 526. The background reproducer 524 reproduces an image of background recorded in a video tape or disc in accordance with a command from the game processing device 510, the data of the reproduced background being then fed to the image synthesizer 526.

Each of the image information generators 520 is synchronized with the other image information generators 520 to control the start of game scene, the speed of reproduction and so on.

Each of the image synthesizer 526 is adapted to synthesize an overlapped scene consisting of an image of sight 102, an image from the target image generator 522 and an image from the background reproducer 524. The synthesized scene is then projected onto the screen 110 through the corresponding projector 300.

It is preferred that each of the seats 410 can move in all the directions, that is, tilts, swivels and vertically moves to provide any attitude desired by a player seated on that seat 410 for a presently projected image. If a scene viewed through a window in the spaceship is being displayed on the screen 110, the player would be feel such a sense that he is actually within the spaceship. To this end, for example, the floor 240 shown in FIG. 1 may be tilted about its central point in all the directions through a hydraulically actuated lifting mechanism (not shown). In such a case, the screen means 100 will be tilted in synchronism with the tilting of the floor 240. If desired, each of the seats 410 may be tilted, swiveled and vertically moved irrespectively of the presently projected scene. Furthermore, the screen means 100 may be stationary and only the base 200 may be moved in all the directions.

SECOND EMBODIMENT

Referring now to FIGS. 6 through 13, there is shown the second preferred embodiment of a multi-player type video shooting game playing system according to the present invention.

The second embodiment is characterized by that a screen means 100 is stationary and that only a base 200 is moved in all the directions through a hydraulically actuated lifting mechanism. Players on the base 200 can feel such a sense that they are actually within the spaceship. This results in further increase of the reality.

Figure 6:
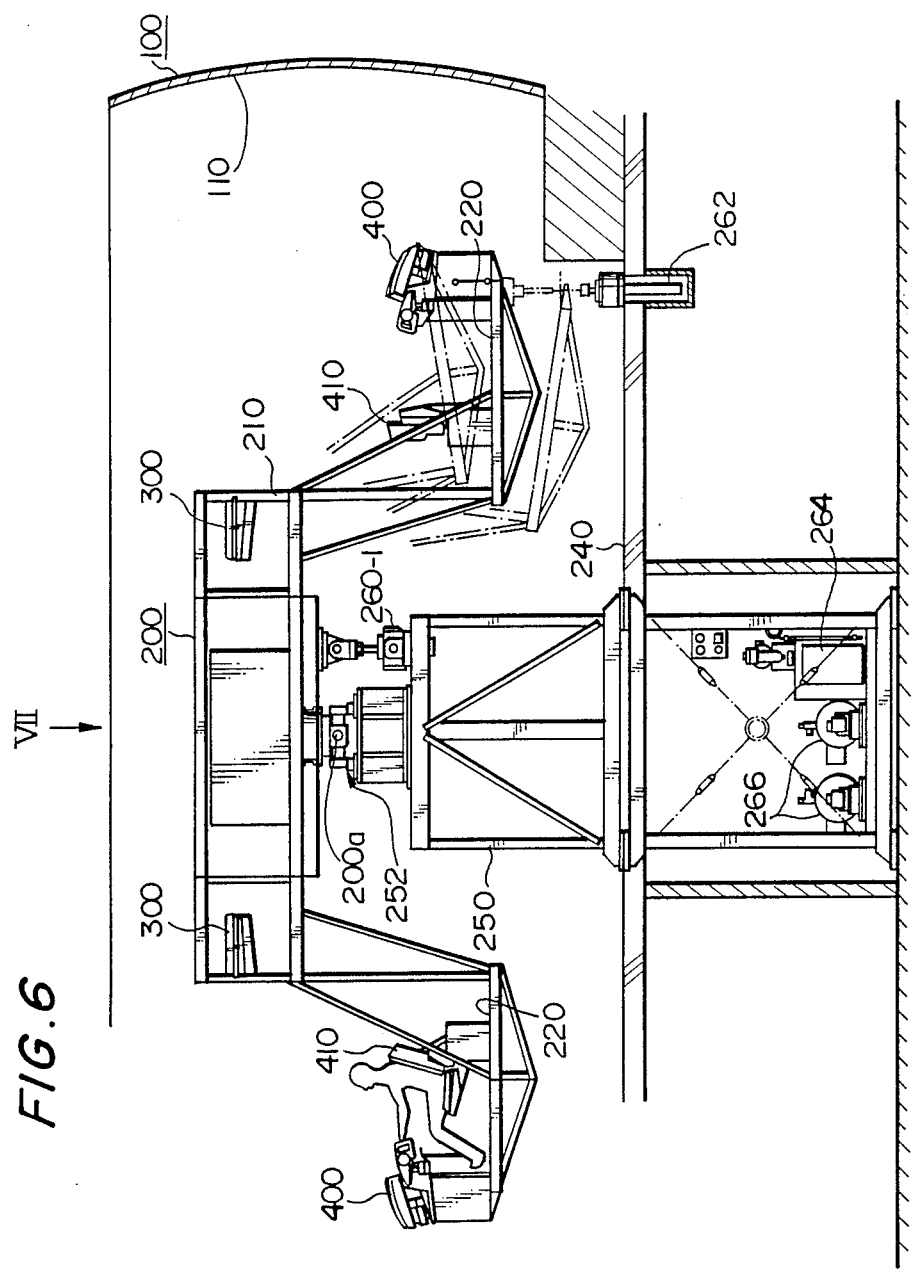

As seen from FIG. 6, the game playing system comprises a supporting platform 250 on the floor 240. The base 200 is supported on the supporting platform 250 tiltably about a fulcrum 200a through a universal joint 252.

The supporting platform 250 also supports two lifting mechanisms 260 for tilting the base 200.

Figure 7:
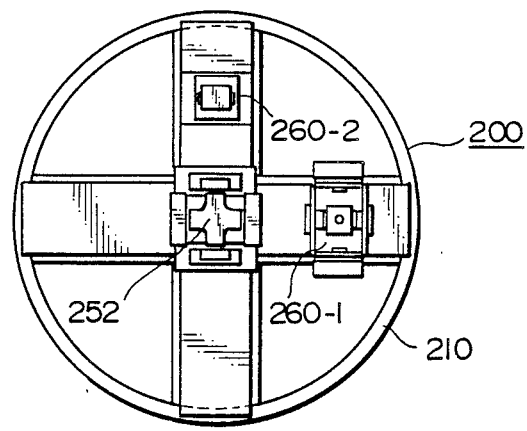

FIG. 7 is a schematic view of a central tower 210 on the base 200 as viewed from the direction of arrow VII in FIG. 6. As seen from FIG. 7, two lifting means 260-1 and 260-2 are disposed between the support platform 250 and the base 200 at two positions angularly spaced 90 degrees from each other about a fulcrum point 200a. Each of the lifting means 260-1 and 260-2 is hydraulically actuated by hydraulic fluid forcedly fed from a reservoir 264 through a hydraulic motor and pump mechanism 266 located below the floor, the reservoir and mechanism 264, 266 being located below the floor. When one of the lifting means 260-1 or 260-2 is energized, the base 200 is tilted about the fulcrum point 200a to any desired angular position as shown by one-dot and chain line in FIG. 6.

When a player or players are getting on the table 220, it is preferred that the base 200 is be held at its horizontal position without trembling. For such a purpose, a plurality of piston and cylinder mechanisms 262 are disposed on the floor 240 below the table 220 at angular space intervals. The piston and cylinder mechanisms 220 can be retracted not to interfere with the game being played. After the game is terminated or before the next game is started, the piston and cylinder mechanisms 260 are extended upwardly as shown by one-dot and chain line in FIG. 6. When extended, the piston and cylinder mechanisms 260 stably support the table 220 such that a plurality of players can move on the table 220 without trembling.

In the game playing system of such a type that the base 200 is tilted as in the second embodiment, there will be created a change in distance between the respective one of the projectors 300 and the screen 110 if the latter is only formed into a cylidrical configuration. The change in distance results in deformation of the game scene projected onto the screen 110. If the base 200 is upwardly tilted, an upwardly elongated game scene will be projected onto the screen 110. If the base 200 is downwardly tilted, a downwardly elongated game scene will be projected onto the screen 110.

In order to overcome such a problem, the second embodiment of the present invention is characterized by that the screen 110 is formed into a spherical configuration and that the base 200 includes its fulcrum point 200a aligned with the center of the spherical screen 110.

In such a manner, the distance between each of the projectors 300 and the screen 110 can be maintained constant irrespectively of the tilting of the base 200.

Figure 8:
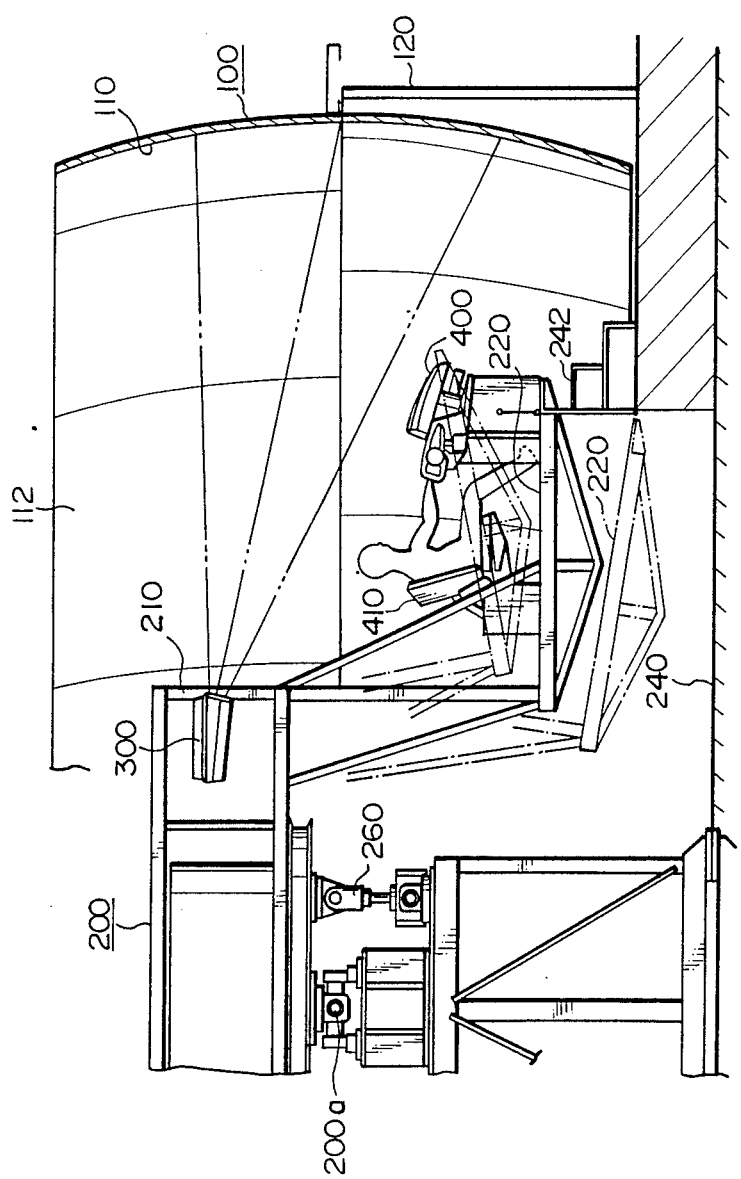

FIG. 8 shows the concrete structure of a spherical screen 110 constructed according to the second embodiment of the present invention. The spherical screen 110 is formed by joining a plurality of segment panels 112 each of which defines part of the sphere.

Figure 9:
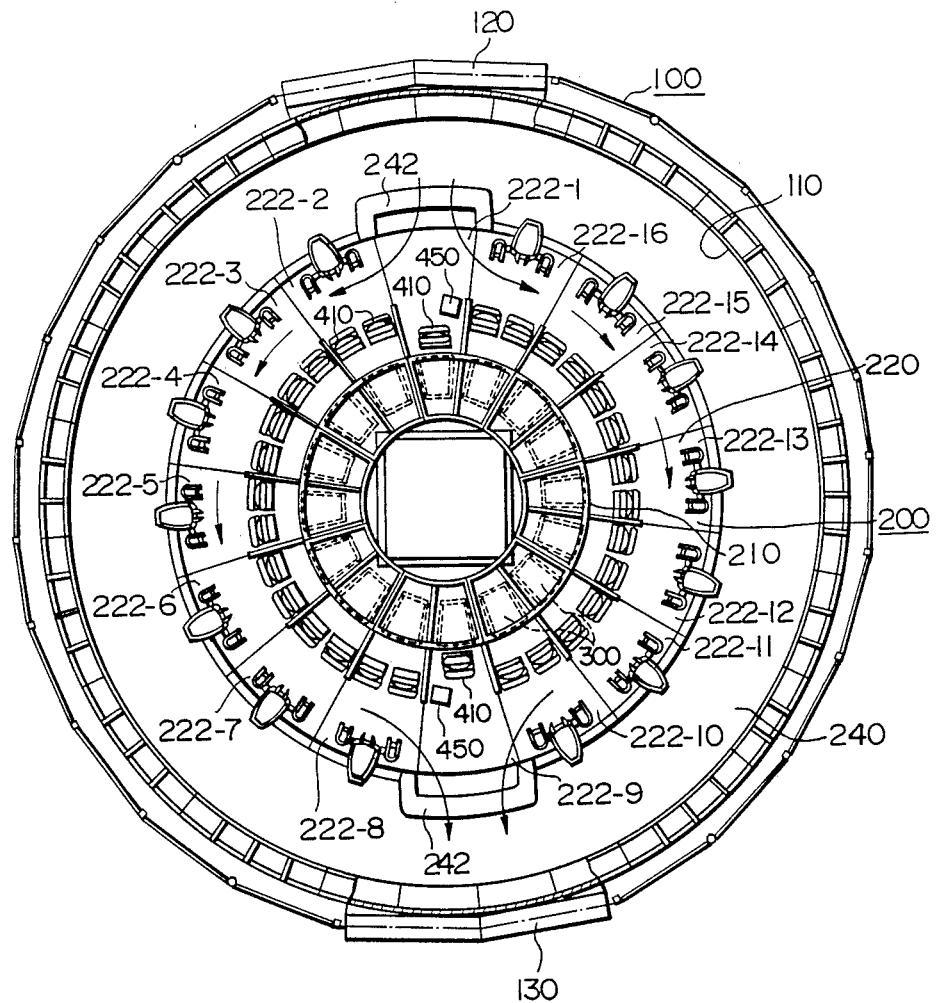

FIG. 9 is a schematic plan view of a game playing system constructed in accordance with the above concept of the present invention. This game playing system comprises a base 200, a tower 210 on the base 200, a plurality of projectors 300 radially disposed on the base and a ring-shaped table 220 disposed around the entire circumference of the tower 210.

Figure 10:
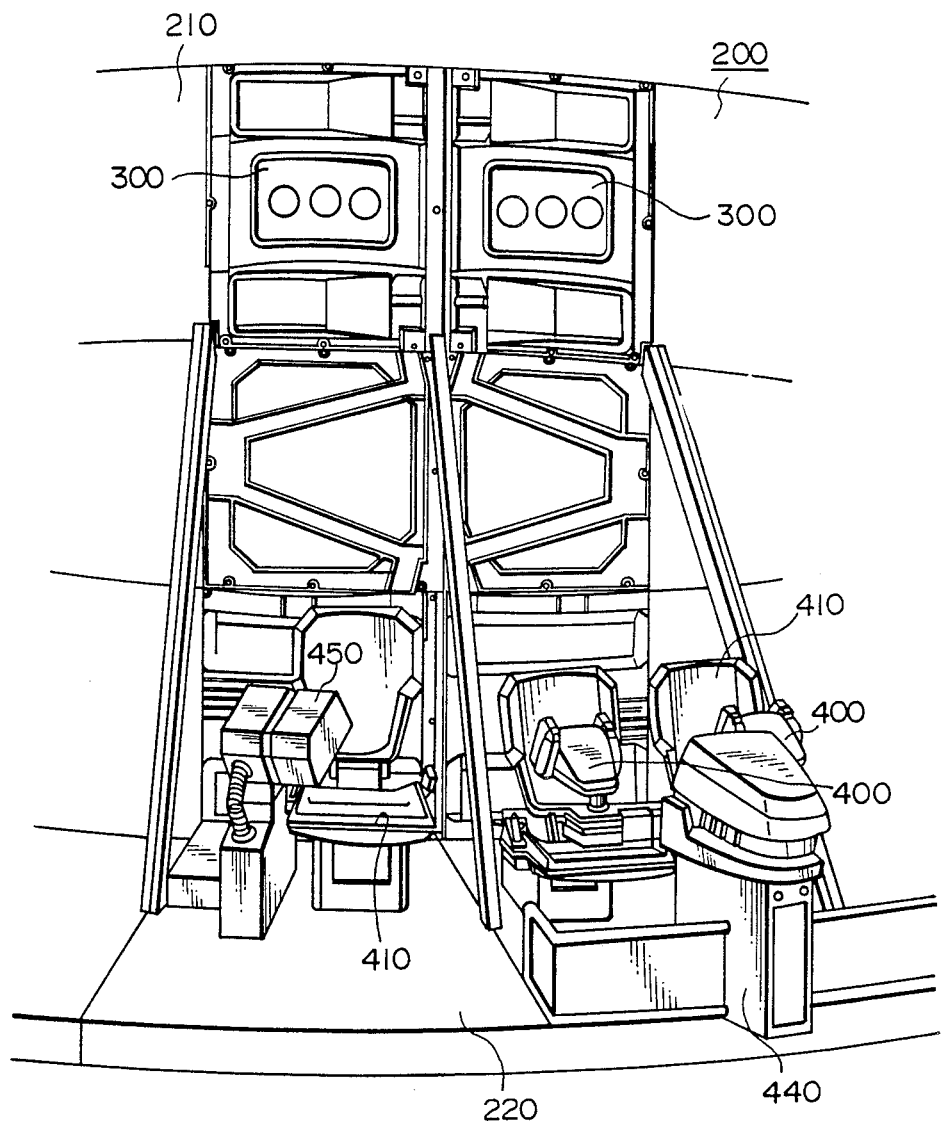
Figure 11:
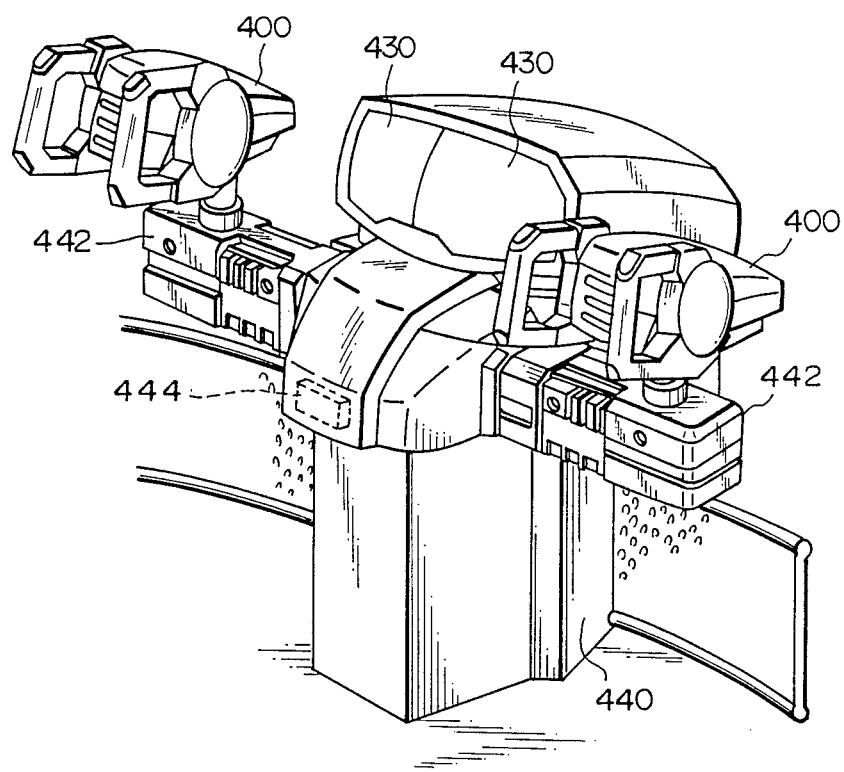

The table 220 comprises 16 blocks 222-1, 222-2 . . . 222-16. As shown in FIG. 10, two blocks 222-1 and 222-9 located at the diametrically opposite positions about the tower 210 comprise seats 410 and advisor's boxes 450, respectively. The remaining blocks 222-2, 222-3 . . . 222-8, 222-10, 222-11 222-16 respectively support two-player seats 410 and guns 400, as shown in FIG. 10. As seen from FIG. 11, two guns 400 on one block are pivotally mounted on two arms laterally extending from a support 440 for motion in all the directions. When each of the guns 400 is actuated by depressing a trigger 402, a vibrator (not shown) located within the gun 400 will be actuated to provide a vibration similar to the staccato of a machine gun.

Each of the supports 440 also includes two CRT's 430 each of which is faced to one of two players seated on the two-player seat 410. Each support 440 further includes two foot lights 444 each of which is adapted to illuminate the foot of each player seated on the two-player seat 410.

Figure 12:
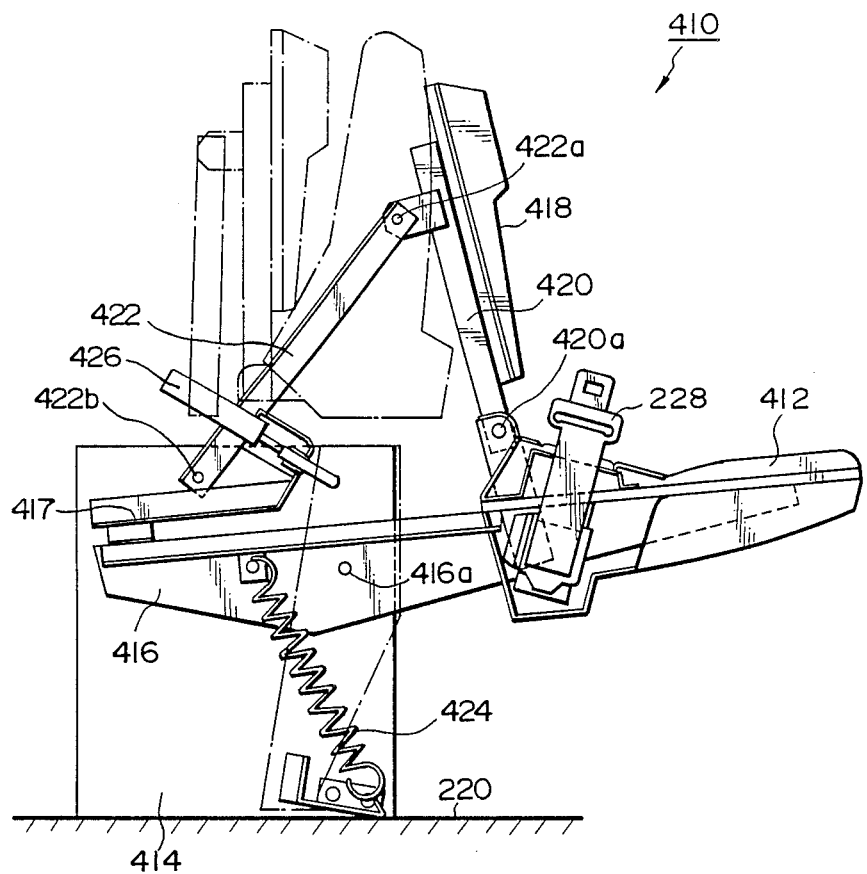

FIG. 12 shows the concrete structure of each of the seats 410 on the table 220. Each of the seats 410 is of such a type that when the seat 410 is not used, its sitting portion 412 can be upwardly moved. This provides a space sufficient for a player to walk between the gun 400 and the seat 410.

Each of the seats 410 comprises a stationary frame 414 fixedly mounted on the table 220 and a sitting frame 416 pivotally mounted on the stationary frame 414 about a pivot shaft 416a. The sitting frame 416 includes a sitting face 412 on which a player is seated.

The sitting frame 416 includes a seat back frame 420 pivotally mounted thereon about a pivot shaft 420a, on which a back 418 is disposed. Between the seat back frame 418 and the stationary frame 414 there is pivotally mounted a frame 422 at pivot shafts 422a and 422b.

There is further a stopper 417 for limiting the clockwise rotation of the sitting frame 416 which is biased counterclockwise by a spring 424 such that the sitting frame 416 can be automatically moved upwardly when not used, as shown by two-dot and chain line in FIG. 12.

If the seat 410 is to be used, the sitting frame 416 may be simply forced to move to a position shown by solid line in FIG. 12. For safety, the player on the seat 410 is preferably constrained by a seat belt 228. Immediately as the player stands, the sitting frame 416 can be moved to the position shown by two-dot and chain line in FIG. 12 under the action of the spring 424. In order to damp an impact created on the upward movement of the sitting frame 416, there is shock absorber means 426 in the frame 422.

The game playing system is provided with an entry 120 and an exit 130 which are located at positions diametrically opposed about the center of the base 200. The blocks 222-1 and 222-9 of the table 210 are disposed opposed to the entry and exit 120, 130, respectively.

Prior to the start of a game, players may enter the game space through the entry 120 and move onto the table 220 through the stair 242. As shown by arrow in FIG. 9, the players may walk to and sit on their seats, respectively.

When each of the players on the seat 410 wears his seat belt 228, it is automatically detected by a sensor and displayed on the console 450 for the advisor. After all the players wear their seat belts, the advisor may confirms it and start the game.

When the game is finished, each player releases his seat belt and stands from his seat 102. Thus, the sitting frame 416 of the seat will be automatically moved upwardly to provide a sufficient space that the player can walk easily. Accordingly, all the players can move out of the game space through the exit 130 as shown by arrow in FIG. 9.

Figures 13, 13A:
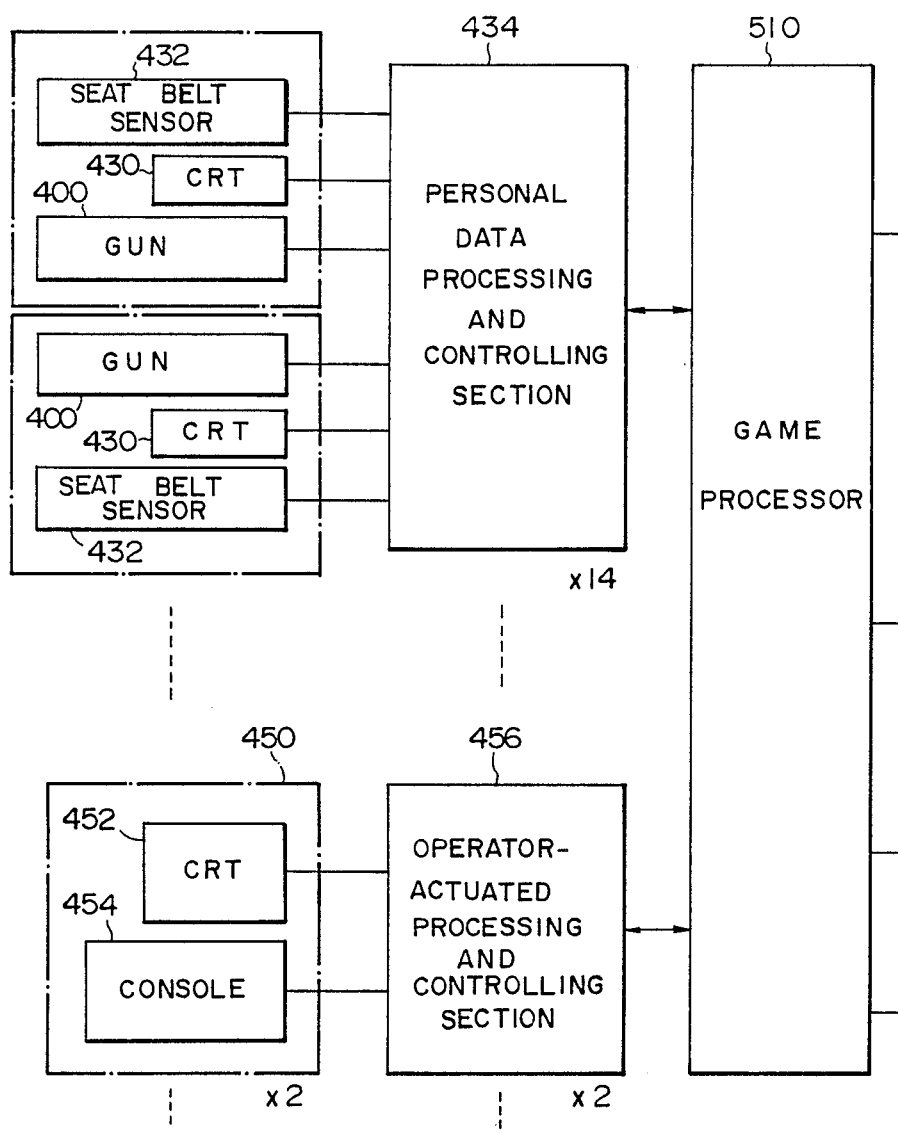
Figure 13B:
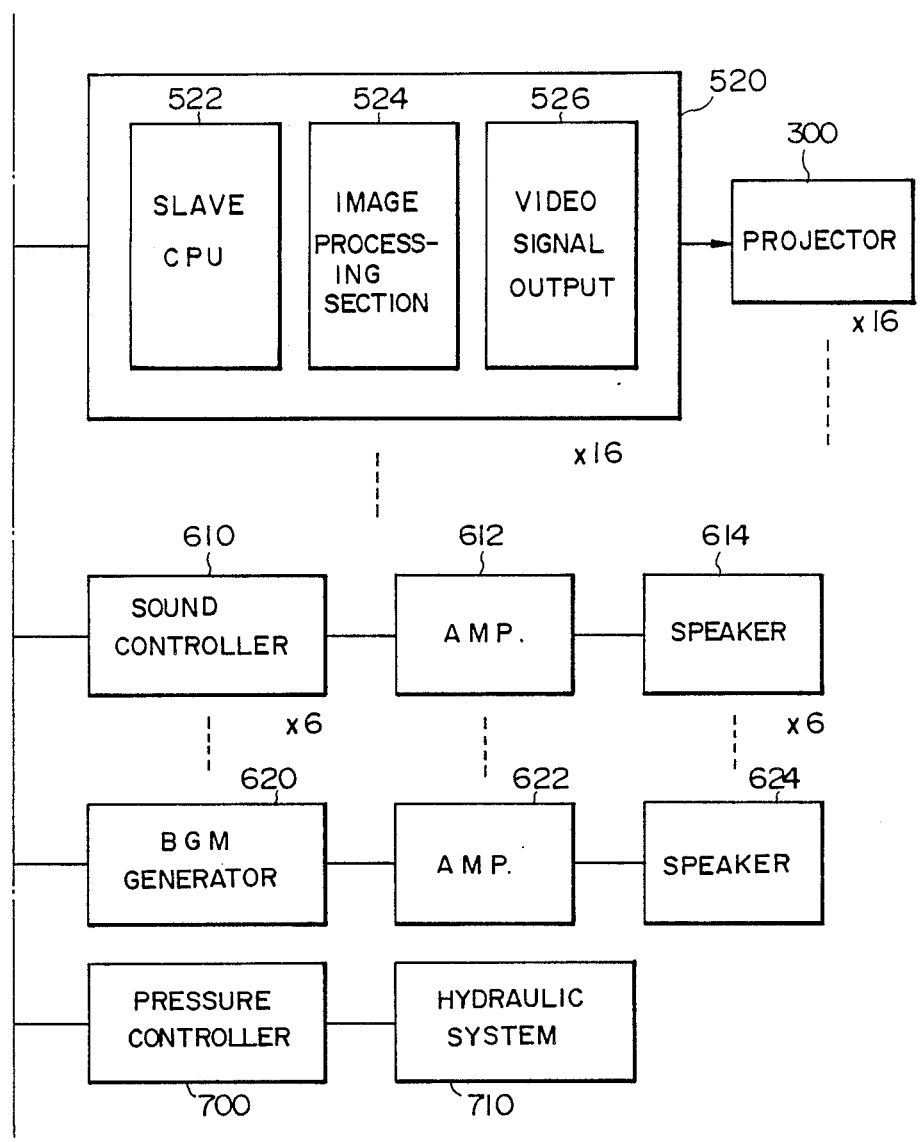

FIG. 13 schematically shows a circuitry usable in the game playing system as shown in FIG. 9. The circuit comprises a game processing device 510 for generating data for operating the peripheral instruments, depending on the state of progress. The game processing device 510 is connected with personal data processing and controlling sections 434, operator's processing and controlling sections 456, image information generators 520, sound control sections 610, a BGM generator 620 and a hydraulic pressure controller 700.

The personal data processing and controller sections 434 are 14 in total number for table-blocks 222 on which players sit. One of the personal data processing and controller sections 434 is allocated to two players. Namely, each personal data processing and controller section 434 comprises is connected with two seat belt sensors 432, two guns 400 and two CRT's 430. The personal data processing and controlling section 434 is adapted to transmit input signals from the seat belt sensors 432 and the guns 400 (for example, shooting data, direction data and so on) to the game processing device 510 while at the same time displaying information from the game processing device 510 on the CRT's 430.

The operator's processing and controlling sections 456 are two in number for the clerk's seat blocks 222 on the table 220. Each of the operator's processing and controlling sections 456 is connected with an operation box 450 on the corresponding block. The operation box 450 includes a CRT 452 and a console 454. Each of the operator's processing and controlling sections 456 is adapted to receive various types of input signals from the corresponding console 454 (for example, game start signal, game termination signal and so on) and to transmit these input signals to the game processing device 510. Each operator's processing and controlling section 456 also functions to display information from the game processing device 510 (for example, progress state data, malfunction informing data and so on) on the corresponding CRT 452. Thus, each advisor can completely grasp the entire state of the game playing system.

The game processing device 510 receives input signals from the personal data processing and controlling sections 434 and the operator's processing and controlling sections 456 to determine a game scene to be projected onto the screen 110 and to transmit these data to the respective image information generators 520, in accordance with a predetermined game program. At the same time, the game processing device 510 determines sound data, background music data and other data which in turn are to be transmitted to the sound control section 610 and the BGM generators 620, depending on the present state of the game. Furthermore, the game processing device 510 determines signals for controlling the tilting of the base 200, which in turn are supplied to the hydraulic pressure controller 700, depending on the progress of the game.

The image information generators 520 are 16 equal to the number of the projectors 300. Based on the information of game scene determined by the game processing device 510, each of the image information generators 520 processes and determines image signals representing an image to be projected onto the screen 110 from, the corresponding projector 300.

Each of the image information generators 520 comprises a slave CPU 522, an image processing section 524 and a video signal output section 526. The slave CPU 522 performs its function in accordance with commands from a master CPU incorporated into the game processing device 510 and is adapted to determine to which part of the determined game scene to be displayed is allocated to the corresponding projector 300, depending on scene determining data, that is, game scene data determined according to the progress of the game. Namely, the slave CPU 522 functions as allocated image determining means.

The image processing section 522 has previously stored the entire data of image to be used throughout the game and functions to digitally process and determine image data in the allocated area determined by the slave CPU 522. All the image processing sections 524 have stored the same three-dimensional images represetative of a game space. These three-dimensional images are formed by combining polygonal forms with one another.

The slave CPU 522 determines which direction the three-dimensional images are to be viewed in, that is, which direction a panorama extending 360 about a point of view is to be viewed from. Thus, it can be determined which projector 300 is to be allocated to a part of the 360° panorama. In accordance with the allocation data so determined, that is, a command for indicating which direction the image extending through 360° is to be viewed from, the image processing section 524 processes and determines an actually three-dimensional image consisting of the combination of polygonal forms, which image is then converted into a two-dimensional, that is, false three-dimensional image.

An image synthesizer for synthesizing a false three-dimensional image from the combination of polygonal forms is disclosed, for example, in U.S. Pat. Nos. 4,831,557 or 4,829,295.

The video signal output section 526 functions to convert digital data thus processed and determined into video signals which in turn are supplied to the corresponding projector 300.

In such a manner, a game scene continuously extending around the entire circumference of the screen 110 will be projected from all the projectors 300 onto the screen 110 each of which is allocated to the corresponding image area in the panoramic image.

Each of the sound control sections 610 receives, from the game processing device 510, data representing the progress of the game and processes the data to form sound data which in turn is outputted from the corresponding speaker 614 through an amplifier 612 associated therewith. FIG. 13 shows six sets each consisting of a sound controller 610, an amplifier 612 and a speaker 614.

The BGM generator 620 similarly generates background music in accordance with data of the progress of game outputted from the game processing device 510, the background music being outputted from a speaker 624 through an amplifier 622.

The hydraulic pressure controller 700 functions to energize hydraulic systems 710 for tilting the base 210, depending on data relating to the progress of the game, which is outputted from the game processing device 510. One of these hydraulic systems 710 is, for example, a hydraulic motor 266 for driving a hydraulic pump, as described.

In such an arrangement, the game playing system will be further described in connection with a story in which a plurality of players getting on a spaceship try to return the earth while fighting enemies which attack the spaceship.

First of all, the base 200 is held horizontally. The entry 120 is then opened to permit a plurality of players to get on a spaceship (actually, the table 220 on the base 200) through the stair 242. At this time, each of the seats 410 has been placed at its upwardly moved position. Thus, a sufficient space for the players is provided on the table such that the players can easily move to their seats distributed from the entry 120 to the exit 130.

When each of the players sits on his seat 410, he wears his seat belt 228. This is detected by the corresponding seat belt sensor 432 and displayed on the CRT 422 for each advisor through the game processing device 510. Therefore, the advisors can confirm whether or not all the players wear their seat belts.

If all the players have sat on the seats and worn the seat belts, the entry 120 is closed and the lighting is turned off. The advisors placed adjacent to the entry and exit are supposed to be a captain and a co-captain in the spaceship which is to be started. When the main advisor, that is, the captain operates his console 424 to depress a start button, a game is initiated.

In accordance with data outputted from the game processing device 510 to various peripheral instruments, the image information generators 520 causes the projectors 300 to project, onto the screen 110, a panoramic 360° extending scene representing a cosmo-space scene viewed through windows in the spaceship.

The hydraulic pressure controller 700 energizes the hydraulic systems 710 to tilt the base for the attitude of the spaceship cruising in the cosmo-space.

Thus, all the players can observe the cosmo-space scene extending on the screen 110 and feel the actual sense as to move in the cosmo-space with increased reality.

Each player may him and shoot an enemy spaceship moving on the screen 110 by moving his gun 400 in all the directions.

Since the screen 110 is formed into a spherical configuration having its center aligned with the center of the base 200, any tilt in the base 200 will not deform the image presently projected onto the screen 110.

Furthermore, it is preferred that the screen 110 is formed of such a material that creates diffused reflection on the surface of the screen 110. Therefore, the brightness of image felt by all the players can be equalized throughout the screen 110.

During playing of the game, the BGM generator 620 generates a background music matching the progress of the game story. At the same time, the sound controllers 610 produce, through the speakers 614, various effectual sounds representative of attacks from enemy spaceships, meteorites passing by the spaceship, shocks created when any enemy spaceship is exploded, and so on.

When the game is terminated, the base 200 is returned to and held at the horizontal position. The underside of the table 220 is engaged by the extended piston and cylinder mechanisms 262. The lighting is then turned on and the exit 130 is opened.

When each of the players stands, his seat 410 is automatically moved upwardly to its storage position such that a sufficient space is provided between the gun 400 and the seat 410.

Although the present invention has been described as to some embodiments, it will not be limited to those embodiments and may be carried out in connection with various modifications and variations without departing from the basic concept of the present invention.

For example, the screen 110 may be formed into semi-cylinder or semi-sphere.

Although the present invention has been described as to the shooting game playing system, it may be applied to any other game, for example, a roll-playing game.

Although the base has been described as to be tilted, the present invention may be applied to control the swinging, vibrating or vertically moving of the base.

As will be apparent from the foregoing, the present invention provides a game playing system which utilizes transversely arched screen and permits a plurality of players to arrange radially toward the arched screen. All the players can face and view the same transversely widened game scene projected onto the arched screen. Therefore, all the players can enjoy the same powerful game with increased reality.

What is claimed is:

1. A multi-player type video game playing system comprises:
   screen means including a transversely arched screen;
   a plurality of projectors arranged radially toward said screen, each of said projectors being allocated to one scene section of a continuously and transversely extending game scene to be projected onto said screen;
   a plurality of player's operating sections arranged radially toward said screen; and
   processor means for processing a game scene to be projected onto said screen in accordance with input signals from each of said player's operating sections and a predetermined game program, the image signals so obtained being then supplied to the respective projectors to form said continuous game scene extending transversely along of said screen, whereby a plurality of players can play and enjoy a game in the common game space while observing the same game scene projected onto said arched screen.

2. A multi-player type video game playing system as defined in claim 1 wherein said screen is formed into a cylindrical configuration surrounding said projectors and player's operating sections.

3. A multi-player type video game playing system as defined in claim 2 wherein said screen is formed into a spherical configuration.

4. A multi-player type video game playing system as defined in claim 3, further comprising:
   base means fixedly supporting said projectors and player's operating sections and receiving a plurality of players each for one of said player's operating sections; and
   base drive means for moving said base into a desired position about the center of said spherical screen.

5. A multi-player type video game playing system as defined in claim 4 wherein said base means comprises:
   a central tower in which said projectors are arranged radially toward said screen;
   a ring-shaped table disposed around the circumference of said central tower, said player's operating sections being arranged thereon radially toward said screen, said table further including a plurality of seats each disposed behind the corresponding one of said player's operating sections; and
   each of said seats having a sitting portion springly movable into its upward or inoperative position to provide a sufficient space between that seat and the corresponding player's operating section when the seat is not used.

6. A multi-player type video game playing system as defined in claim 4 wherein said processor means comprises:
   game processing means for determining a game scene to be projected onto said screen and also for determining sound matching the progress of the game and the position of said base means, in accordance with input signals from the player's operating sections and a predetermined game program;
   a plurality of image information generator means each provided for one of said projectors, each of said image information generator means previously stored image information of the entire game and actually computing image data representative of a game scene section to be projected by that projector onto said screen to produce image signals which are outputted to the corresponding projector, in accordance with a game scene determined by said game processing means;
   position control means for controlling the position of said base means through said base drive means in accordance with positional data determined by said game processing means; and
   sound producing means for producing sounds for the game, in accordance with sound data determined by said game processing means.

7. A multi-player type video game playing system as defined in claim 3, further comprising base means fixedly supporting said projectors and player's operating sections and receiving a plurality of players each operating one of said player's operating sections and base drive means for moving said base about the center of said spherical screen into a desired position and wherein said projectors are arranged radially toward said cylindrical screen about its center and wherein said processor means comprises game processing means for determining a game scene to be projected onto said screen in accordance with input signals from said player's operating sections and a predetermined game program and a plurality of image information generator means each associated with the corresponding one of said projectors, and each of said image information generator means having previously stored image information of the entire game and is actually adapted to compute image data representative of a game scene section to be allocated by that image information generator means to produce image signals outputted to the corresponding one of said projector, in accordance with data relating to game scenes determined by said game processing means.

8. A multi-player type video game playing system as defined in claim 7 wherein each of said image information generator means comprises:
   allocated scene determining means for determining which scene section of a game scene determined by said game processing means is to be allocated to the corresponding one of said projectors and displayed on the screen through that projector;
   image processing means previously stored image information of the entire game and digitally performing the actual computation of image data relating to a game scene section determined by said allocated scene determining means; and
   video output means for converting digital image data from said image processing means into video signals which are outputted to the corresponding one of said projectors.

9. A multi-player type video game playing system as defined in claim 2 wherein said screen has an arched surface providing a diffused reflection.

10. A multi-player type video game playing system as defined in claim 2 wherein said projectors are arranged radially toward said cylindrical screen about its center such that one part of a continuous game scene to be projected onto said screen is allocated to each of said projectors.

11. A multi-player type video game playing system as defined in claim 2, further comprising:
   base means fixedly supporting said projectors and player's operating sections and receiving a plurality of players each operating one of said player's operating sections; and
   drive means for moving said base means in a desired pattern of motion.

12. A multi-player type video game playing system as defined in claim 11 wherein said base means comprises:
   a central tower in which said projectors are mounted radially toward said screen;
   a ring-shaped table disposed around the circumference of said central tower, said player's operating section being arranged on said table radially toward said screen, said table further including a plurality of seats each disposed thereof behind the corresponding one of said player's operating sections; and
   each of said seats having a sitting portion springly movable into its upward or inoperative position to provide a sufficient space between that seat and the corresponding player's operating section when the seat is not used.

13. A multi-player type video game playing system as defined in claim 11 wherein said processor means comprises:
   game processing means for determining a game scene to be projected onto said screen and also for determining sounds matching the progress of the game and the position of said base means, in accordance with input signals from the player's operating sections and a predetermined game program;
   a plurality of image information generator means each provided for one of said projectors, each of said image information generator means previously stored image information of the entire game and actually computing image data representative of a game scene section to be projected by that projector onto said screen to produce image signals which are outputted to the corresponding projector, in accordance with a game scene determined by said game processing means;
   position control means for controlling the position of said base means through said base drive means in accordance with positional data determined by said game processing means; and
   sound producing means for producing sounds for the game, in accordance with sound data determined by said game processing means.

14. A multi-player type video game playing system as defined in claim 2 wherein said screen means includes entry and exit means which are formed therein at diametrically opposite positions about the center of the cylindrical screen.

15. A multi-player type video game playing system as defined in claim 1 wherein said screen is formed into a spherical configuration.

16. A multi-player type video game playing system as defined in claim 15, further comprising:
   base means fixedly supporting said projectors and player's operating sections and receiving a plurality of players each for one of said player's operating sections; and
   base drive means for moving said base about the center of said spherical screen in any desired pattern of motion.

17. A multi-player type video game playing system as defined in claim 1, further comprising position control means for driving and controlling the entire combination of said screen means, projectors and player's operating sections into a desired position.

18. A multi-player type video game playing system as defined in claim 1 wherein said processor means comprises game processing means for determining a game scene to be projected onto said screen in accordance with input signals from said player's operating sections and a predetermined game program and a plurality of image information generator means each associated with the corresponding one of said projectors and wherein each of said image information generator means has previously stored image information of the entire game and is actually adapted to compute image data representative of a game scene section to be allocated by that image information generator means to produce image signals outputted to the corresponding one of said projector, in accordance with data relating to game scenes determined by said game processing means.

19. A multi-player type video game playing system as defined in claim 18 wherein each of said image information generator means comprises:
   allocated scene determining means for determining which scene section of a game scene determined by said game processing means is to be allocated to the corresponding one of said projectors and displayed on the screen through that projector;
   image processing means previously stored image information of the entire game and digitally performing the actual computation of image data relating to a game scene section determined by said allocated scene determining means; and
   video output means for converting digital image data from said image processing means into video signals which are outputted to the corresponding one of said projectors.

* * * * *